July 21, 1942.  W. H. MURAD  2,290,810
BALL BEARING LUBRICATING SYSTEM
Filed July 1, 1941
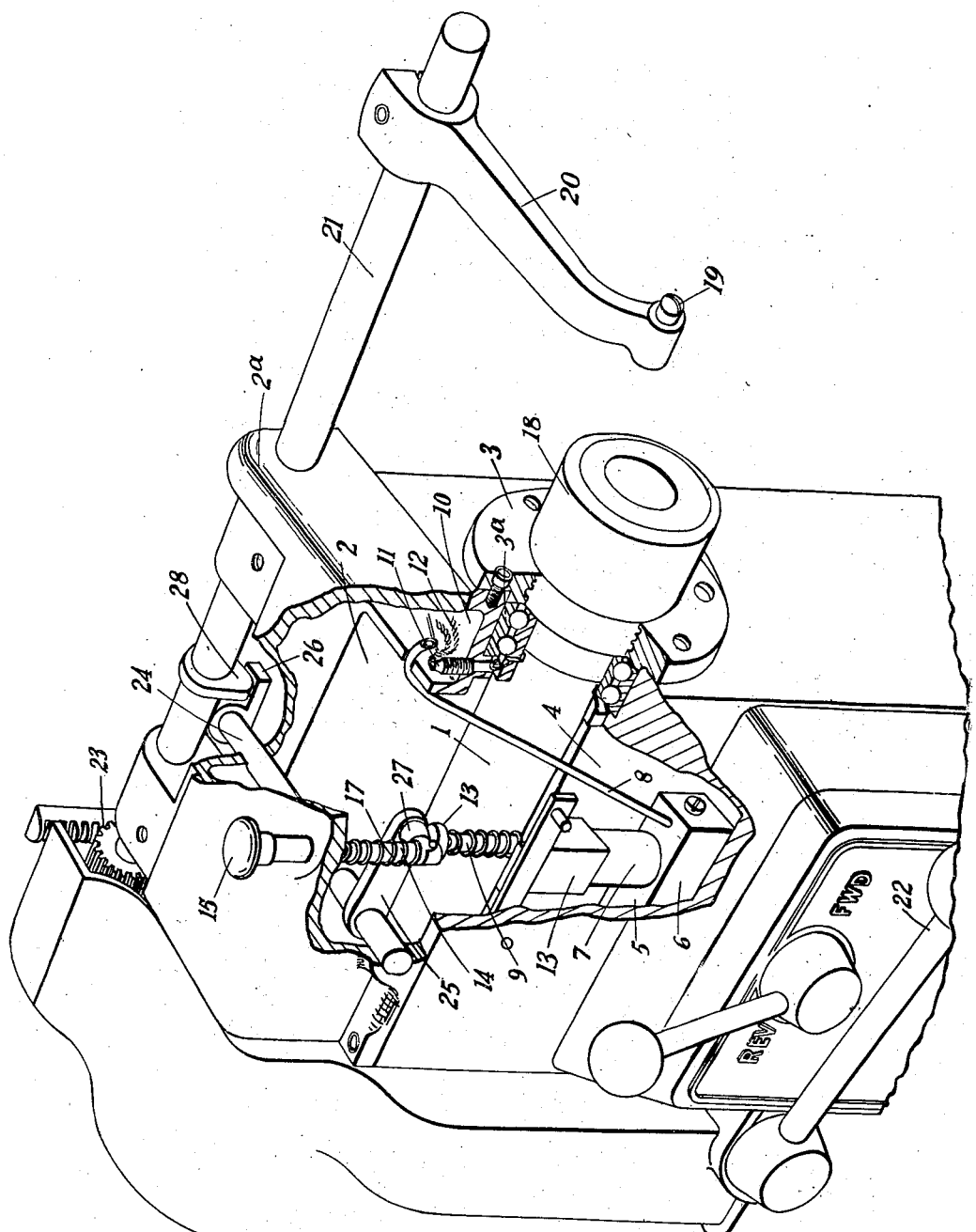
INVENTOR
Wadia Halim Murad
BY
Sager & Malcolm
ATTORNEYS Patented July 21, 1942

2,290,810

UNITED STATES PATENT OFFICE 2,290,810

BALL BEARING LUBRICATING SYSTEM

Wadia Halim Murad, Watford, England

Application July 1, 1941, Serial No. 400,592
In Great Britain February 21, 1940

3 Claims. (Cl. 184—6)

This invention relates to the lubrication of ball bearings.

The lubrication of ball bearings used to support shafts rotated at high speeds is generally effected by the provision of an oil sump together with means for maintaining a supply of oil at such a level that a part of the bearing is normally immersed. This arrangement has the disadvantage, particularly in the case of machines which are kept running at high speeds for considerable lengths of time without stopping, such as for instance machine tools with automatic work feed, that owing to the thrashing action of the revolving parts of the bearing, particularly the cage, on the oil in the enclosed bearing housing, the oil becomes overheated with consequent reduction of its lubricating power. It is the object of this invention to overcome this drawback and to provide for the lubrication of a ball bearing by the maintenance of a fine oil mist in the bearing housing with the aid of means requiring a minimum of energy and attention for their operation and maintenance.

According to the invention means for lubricating one or more ball bearings contained within a closed housing, comprises a sump for a supply of oil the level of which is kept below the lowest level of any moving part of the bearing or bearings, means comprising a distributing cup situated above the highest level of any moving part of each bearing for dispensing lubricant in small quantities at a time from said cup on to a moving part of the bearing with which the cup is associated, and means for periodically raising lubricant from said sump to said dispensing means.

The dispensing means will be constructed according to the individual requirements to be met and according to the space available. The dispensing means may with advantage consist of a cup, which may be formed integrally with the bearing housing, provided with a duct adapted to discharge lubricant on to the bearing cage and filled with absorbent material extending in the form of a wick into and/or through the duct for the purpose of dispensing the lubricant drop by drop.

The means for raising the lubricant from the sump to the dispensing means may comprise any suitable form of force pump either hand or power operated, and provided with rising delivery pipe discharging into the cup or cups of the dispensing means.

In cases in which the bearing housing is provided with a detachable cover, the force pump may be mounted bodily within the housing and be provided with a plunger operable against the action of a return spring by a manually depressible plunger or thrust rod slidably supported in the cover.

According to a further feature of the invention, in apparatus equipped with a forced feed lubricating system of the kind indicated the plunger of the force pump is operatively coupled with an intermittently or periodically moved part of the apparatus to which the ball bearing pertains, for the purpose of operating the pump automatically in dependence on the movement of said part.

According to a further feature of the invention the said coupling means are arranged to effect positive operation of the plunger in one direction only, that is to say in the direction of the delivery stroke of the pump, without interlocking engagement between the coupling means and the plunger, so that the plunger is at all times free to be operated independently of said positive operation, for instance by hand.

An embodiment of the invention, as applied to the head-stock lubrication of a capstan lathe, will now be described in greater detail, by way of example, with reference to the accompanying drawing which shows, in perspective view, the head-stock portion of a machine tool equipped with a lubricating system according to the invention, the main bearing housing being partly broken away to disclose the essential parts of said system.

In the example shown, a spindle 1 traverses an enclosed chamber 2 and is supported in a main bearing 3 of the ball type mounted in a wall of said chamber. The chamber 2 extends below the ball-race housing 3a to provide an oil sump 4. A force pump 5 of the plunger type is equipped with an intake and delivery manifold 6 secured to the base of the sump 4 and having passages communicating on the one hand with the oil in the sump and on the other hand with the interior of the pump barrel 7 and with a rising delivery pipe 8, non-return valves being suitably provided in these passages so that lubricant is drawn into the barrel on the upstroke of the plunger 9 and expelled through the delivery pipe when the plunger is depressed.

Above the main bearing 3 and formed integrally with the wall of chamber 2, is a cup-shaped receiver 10 into which the delivery pipe 8 discharges. Threaded in the base of receiver 10 immediately above the ball-race housing or cage 3a is a nipple 11 through which a wick 12 of absorbent material extends, for the purpose of feeding oil drop by drop to the bearing.

In the present embodiment, the force pump 5 is adapted to be operated both manually and mechanically in dependence upon the operation of a periodically moved part of the apparatus to which the ball-bearing 3 to be lubricated pertains. To this end the plunger 9 is provided with an enlarged head 13 against part of the upper surface of which bears the lower end of a push rod 14 which extends out through an aperture in the cover 2a of the housing 2 and is equipped with a knob 15 for manual operation. A coiled compression spring is inserted between the head 13 and the top of the housing of the force pump 5, to effect the return (delivery) stroke of the pump plunger, and a weaker compression spring 17 is inserted, on the push rod 14, between the cover 2a and a cotter pin or other abutment at the lower end of rod 14, for the purpose of maintaining contact between this rod and the plunger head 13 when the pump is mechanically operated.

In the example shown, the machine tool to which the bearing to be lubricated pertains is of the automatic type in which bar stock is fed through the spindle 1 to a collet chuck 18 on the forward end thereof, and in which an independent stop 19 for limiting the movement of the bar stock through the chuck during the feeding phase, is mounted on a swinging arm 20 attached to a shaft 21 supported at the back of the head-stock structure and rotatable, for swinging the stop 19 into and out of the path of the work, by means of a hand lever 22, through the intermediary of a suitable transmission which includes, in the present instance, rack and pinion gearing 23. The provision of the above-described independent swinging stop constitutes one feature of the machine tool construction forming the subject of my co-pending application Serial No. 400,593, filed July 1, 1941.

The motion required for the mechanical operation of the force pump 5 is conveniently derived from the shaft 21. For this purpose a shaft 24 extending transversely across the upper part of chamber 2 and supported in the front and rear walls thereof has two arms 25 and 26 rigidly attached thereto. Arm 25 is adapted to bear, with the interposition of a roller 27, upon the exposed portion of the plunger head 13 adjacent the lower end of push rod 14, while arm 26 is adapted to be engaged by a cam 28 keyed to shaft 21 and depressed, when this shaft is rotated to bring the stop 19 into the operative position. By suitable dimensioning of the arms 25 and 26 and cam 28, the available periodical movement of the shaft 21 is thus caused to depress the pump plunger 9 through the required length of stroke.

By re-adjustment or replacement of the operating cam 28 it becomes possible to vary the stroke of the pump so as to adjust the supply of lubricant to suit the intervals between successive operations of the swinging stop according to the kind of work done on the machine. When the work is such as to involve exceptionally long intervals between successive operations on the stop, for instance when working on hard material such as cast iron, the proper supply of lubricant can be insured by additional manual operation of the force pump. For most ordinary work the automatic operation of the pump will suffice, with the result that the operative is relieved of the necessity for supervising the lubricating system, a feature which is of great advantage in connection with machine tool work.

The above embodiment of the invention is given by way of example only, and it will be understood that both the source of the drive and the details of the transmission mechanism employed for the purpose of carrying out the invention may be varied according to the nature and construction of the apparatus served by the lubricating system.

What I claim and desire to secure by Letters Patent is:

1. In a lubricating system for a bearing comprising a shaft journaled in a bearing, a plunger type oil pump below said bearing, means for conducting oil from said pump to said bearing, and a vertically disposed plunger for actuating said pump: said plunger comprising a lower portion, means for actuating said portion on the delivery stroke only, and a spring for returning said portion to initial position, an upper portion resting on said first portion for manual operation of said plunger, and a relatively weaker spring for maintaining said second portion in contact with said first portion.

2. In a lubricating system for a bearing comprising a shaft journaled in a bearing, a plunger type oil pump below said bearing, means for conducting oil from said pump to said bearing, and a vertically disposed plunger for actuating said pump: said plunger comprising a lower portion having an enlarged head, and an upper portion, a spring between said pump and said head for urging said lower portion vertically upward, and cam actuated crank means engaging a part of the upper surface of said head for intermittently forcing said lower portion downwardly, said upper portion having its lower end resting on another part of the upper surface of said head and adapted to be manually depressed for independant operation of said pump, and relatively weak spring means for urging said lower end into contact with said head.

3. A lubricating system for a machine tool bearing comprising a first shaft having a work piece stop attached thereto and means mounting said shaft for intermittent rotation, a second shaft extending transversely of said first shaft, a pump, a vertically disposed pump plunger, a crank joined to said second shaft and resting on said plunger for actuating said plunger from said second shaft, and a second plunger resting on said pump plunger for actuating the same independently of said crank.

WADIA HALIM MURAD.